Aug. 29, 1950 — C. A. HARTUNG — 2,520,462
RECALIBRATING MOTOR CONTROL APPARATUS
Filed Jan. 10, 1947 — 3 Sheets-Sheet 1

INVENTOR.
CHARLES A. HARTUNG
BY Arthur H. Swanson
ATTORNEY

Aug. 29, 1950 C. A. HARTUNG 2,520,462
RECALIBRATING MOTOR CONTROL APPARATUS
Filed Jan. 10, 1947 3 Sheets-Sheet 2

*INVENTOR.*
CHARLES A. HARTUNG
BY *Arthur H. Swanson*
ATTORNEY

Aug. 29, 1950     C. A. HARTUNG     2,520,462
RECALIBRATING MOTOR CONTROL APPARATUS
Filed Jan. 10, 1947     3 Sheets-Sheet 3

FIG. 4

INVENTOR.
CHARLES A. HARTUNG
BY Arthur H. Swanson
ATTORNEY

Patented Aug. 29, 1950

2,520,462

UNITED STATES PATENT OFFICE 2,520,462

RECALIBRATING MOTOR CONTROL APPARATUS

Charles A. Hartung, Ridley Park, Pa., assignor, by mesne assignments, to Minneapolis-Honeywell Regulator Company, Minneapolis, Minn., a corporation of Delaware Application January 10, 1947, Serial No. 721,242

10 Claims. (Cl. 318—28)

The present invention relates to measuring apparatus adapted to measure minute electrical currents or potentials, and, specifically, to measuring apparatus of the balanceable potentiometric, conversion type. More specifically, the invention relates to improved means for maintaining such potentiometric measuring apparatus continuously standardized.

A general object of the present invention is to provide improved measuring apparatus of the balanceable potentiometric, conversion type. A more specific object of the present invention is to provide improved means which are especially well suited for the production of a constant direct potential for energizing the potentiometric measuring circuit of such measuring apparatus. A still more specific object of the invention is to provide means including a source of standard voltage for use in connection with a potentiometric measuring circuit to supply to the latter energizing voltage which is maintained at a constant value for extended periods of time, without the use of manual or automatic periodic standardizing means as heretofore employed, and without subjecting the source of standard voltage employed as a voltage reference to any objectionable current drain.

A further specific object of the invention is to provide constant voltage energizing or continuous standardizing means for use with potentiometric measuring apparatus which means comprises one or more of the main components of the measuring apparatus. Thus one or more of the components of the measuring apparatus is utilized continuously to effect both measuring and standardizing operations. It is a still further specific object of the present invention to provide, in connection with continuous automatic standardizing means for potentiometric apparatus, means utilizing a vibrating reed converter energized with alternating current for converting a unidirectional current into an alternating current having a frequency which is twice that of the energizing alternating current.

It has been recognized by those concerned with the measurement of minute electrical potentials by the potentiometer method, especially in connection with the use of automatic or self-balancing potentiometers, that the voltage employed to energize the potentiometric circuit must be maintained at a constant value, if the potentiometer is to be maintained in calibration so that consistently accurate results can be obtained in successive measurements. It has also been found that the terminal voltage of the dry cells customarily employed to energize self-balancing potentiometric circuits decreases over the operative life of the cell to such an extent that it is not possible to so employ such cells in apparatus which is used to make measurements with a high degree of accuracy over extended periods of time without providing means for compensating for this inherent instability of terminal voltage. To accomplish the maintenance of a constant potentiometric circuit energizing voltage, various schemes have been used heretofore, the most widely used one being that wherein there is employed a standard cell and associated manual or automatic periodic standardizing means. Such standardizing apparatus operates periodically, either under manual or automatic control, effectively to compare the potentiometric energizing voltage with the voltage of the standard cell and to adjust, if necessary, the former voltage with reference to the latter so that the energizing voltage is maintained at a constant value.

The use of intermittent or periodic standardizing means has several serious disadvantages. First of all, such automatic standardizing mechanism is necessarily complicated, while manual standardizing, though less complicated, requires the attention of an operator. Secondly, with any form of periodic standardizing, there will be periods between successive standardizing operations during which the potentiometric energizing voltage may change a sufficient amount to cause erroneous measurements to be obtained in cases where high measuring accuracy is extremely important.

The present invention provides a form of standardizing which is particularly well adapted for use with self-balancing potentiometric systems and which provides continuous automatic standardizing, assuring a constant supply of energizing voltage to the potentiometric circuit at all times, and hence assuring highly accurate results in measurements made over extended periods of time.

In the operation of the present invention, the energizing voltage supplied to the potentiometric circuit is continuously compared with the voltage of a standard cell, and a variable resistor connected in series with the source of energizing voltage is continuously adjusted by an electric motor energized from an electronic amplifier so as to maintain constant the energizing voltage supplied to the potentiometric circuit. In one form of the preferred embodiment of the invention illustrated herein, a single electro-mechanical, vibrating reed converter is common to both the measuring and standardizing portions of a conversion type, self-balancing potentiometric measuring system, and is operative to modify simultaneously and continuously the signals in these two portions of the system. In another form of the illustrated embodiment of the invention, a single electro-mechanical, vibrating reed converter is utilized to modify the measuring and standardizing signals simultaneously and continuously and to produce in a single channel electronic amplifier, which is common to both the measuring and standardizing portions of the system, corresponding alternating current signals, one of which has a frequency which is twice that of the other. One of these signals is utilized to produce continuous balance of the measuring system, and the other is utilized to maintain constant the potentiometric circuit energizing voltage.

The various features of novelty which characterize this invention are pointed out with particularity in the claims annexed to and forming a part of this specificaton. For a better understanding of the invention, however, its advantages and specific objects obtained with its use, reference should be had to the accompanying drawings and descriptive matter in which are illustrated and described preferred embodiments of the invention.

Figure 1:
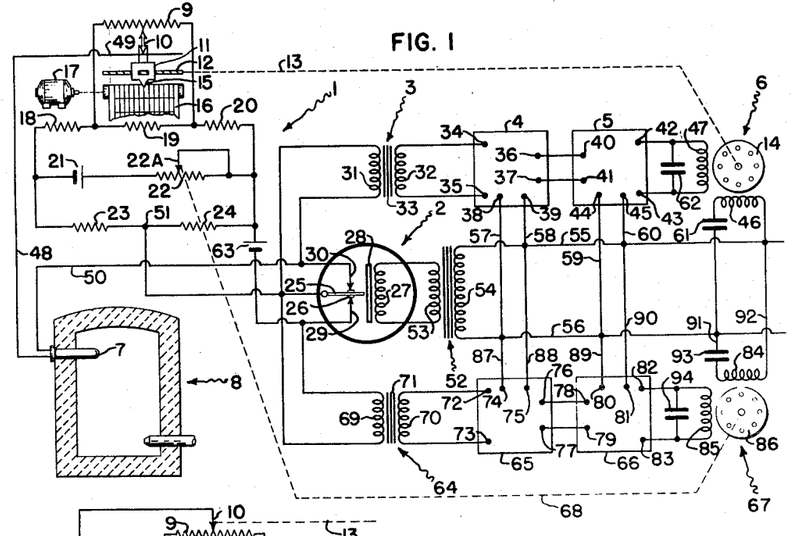
Fig. 1 is a circuit diagram illustrating a preferred embodiment of the present invention in connection with self-balancing potentiometric measuring apparatus of a well known type.

There is illustrated in Fig. 1 the circuit diagram of a well known form of self-balancing potentiometric measuring apparatus of the type disclosed and claimed in the copending U. S. Patent application of Walter P. Wills, Serial No. 421,173, filed December 1, 1941, which issued as Patent No. 2,423,540 on July 8, 1947. The system of Fig. 1 comprises a potentiometric measuring circuit generally designated at 1, a vibrating reed converter 2, an input transformer 3, an electronic voltage amplifier 4, a power amplifier and motor drive circuit 5, and a two phase reversible induction motor generally designated at 6. These units operate together to effect the measurement of minute unidirectional potentials in a manner described in detail in said Wills patent.

In Fig. 1, the potentiometric system is shown by way of illustration as being of the recording type connected to indicate and record the instantaneous values of the temperature of a thermocouple 7 and of a furnace 8 in which the thermocouple 7 is located. To this end, the potentiometric circuit 1 includes a slide-wire resistance 9 having a sliding contact 10 which is mounted on a carrage 11. The carriage 11 is carried on, and moved laterally by, a threaded drive shaft 12 which is connected by a suitable mechanical linkage 13 to the rotor 14 of the motor 6. The measuring system operates in a manner well known to those skilled in the art to cause the sliding contact 10 to be moved along the slide-wire resistance 9 by operation of the motor 6 so that the contact 10 is positioned according to the instantaneous temperatures of the furnace 8. The carriage 11 also carries a marking element such as a pen 15 which cooperates with a record sheet such as the chart 16 to produce thereon a continuous record of the various instantaneous furnace temperatures over a period of time. The chart 16 is moved as a function of time at a constant speed in a direction perpendicular to the direction of travel of the pen 15 by suitable chart driving means such as a synchronous motor 17.

In addition to the slide-wire resistance 9, the circuit 1 comprises three parallel-connected branches. The first of these is a measuring branch, including three resistors 18, 19 and 20, connected in series. The slide-wire resistance 9 is connected in parallel with the resistor 19, the latter being located between the resistors 18 and 20. The second parallel branch is an energizing branch including a battery 21 and a variable resistor 22, having a sliding contact 22A, connected in series. The third branch is a compensating branch, including a thermocouple cold junction compensating resistor 23 and a standardizing resistor 24 connected in series.

The vibrating reed converter 2 is of the type disclosed in said Wills patent and in U. S. Patent 2,398,341 granted to Walter P. Wills on April 9, 1946, and disclosed and claimed in the copending application of Frederick W. Side, Serial No. 421,176, filed December 1, 1941, which issued as Patent No. 2,423,524 on July 8, 1947.

The converter 2 comprises a vibrating reed 25 which carries a contact 26 and which is maintained in a vibrating condition by the conjoint action of an alternating current energized operating coil 27 and a permanent magnet 28. Two stationary contacts 29 and 30 are so arranged relative to the reed 25 and the contact 26 that the latter alternately engages the contacts 29 and 30 as the reed is caused to vibrate by the coil 27 and the magnet 28.

The transformer 3 is of the voltage step-up type, comprising a low impedance primary winding 31 and a high impedance secondary winding 32 wound in the conventional manner upon a suitable core 33. The electronic voltage amplifier 4 may be of any suitable type, such as the type disclosed in said Wills patents. The amplifier 4 includes input terminals 34 and 35, output terminals 36 and 37, and energizing terminals 38 and 39.

The power amplifier and motor drive circuit 5 may well be of the type disclosed in said Wills patents, including input terminals 40 and 41, output terminals 42 and 43, and energizing terminals 44 and 45. The motor 6 may also be of the type shown in said Wills patents, comprising in addition to the rotor 14 a power winding 46 and a control winding 47.

In the system of Fig. 1, one terminal of the thermo-couple 7 is connected by a conductor 48 to the sliding contact 10 of the slide-wire resistance 9. Connection to the contact 10 is made through a collector bar 49 with which the contact 10 is in continuous engagement. The remaining thermocouple terminal is connected by means of a conductor 50 to one end terminal of the transformer primary winding 31 and to the stationary converter contact 30. The remaining end terminal of the winding 31 is connected to the converter contact 26 through the reed 25, and is also connected to a point 51 which is the junction between the resistors 23 and 24 in the circuit 1.

The secondary winding 32 of the transformer 3 is connected between the input terminals 34 and 35 of the amplifier 4. The output terminals 36 and 37 of the latter are respectively connected to the input terminals 40 and 41 of the circuit 5. The motor control winding 47 is connected between the output terminals 42 and 43 of the circuit 5.

A voltage step-down transformer 52 is employed to supply alternating energizing current to the converter coil 27. The transformer 52 comprises a low voltage secondary winding 53 and a line voltage primary winding 54. The coil 27 is connected across the winding 53, and the winding 54 is connected between supply conductors 55 and 56 which are in turn connected to a suitable source of alternating current, not shown. The energizing voltage supplied by the conductors 55 and 56 is herein assumed to be 115 volts A. C., having a frequency of 60 cycles per second.

The amplifier 4 receives energizing current from the conductors 55 and 56, the energizing terminal 38 being connected to the conductor 56 by a branch conductor 57, and the terminal 39 being connected to the conductor 55 by a branch conductor 58. Likewise, the circuit 5 is energized from the conductors 55 and 56, the energizing terminals 44 and 45 being respectively connected by branch conductors 59 and 60 to the supply conductors 56 and 55, respectively. The motor power winding 46 is connected between the conductors 55 and 56 in series with a condenser 61. A condenser 62 is connected in parallel with the motor control winding 47.

When the slide-wire contact 10 is in the position along the slide-wire resistance 9 which corresponds to the then existing temperature of the thermocouple 7 and furnace 8, the potentiometric system is said to be balanced, and no voltage appears between the potentiometric output terminal 51 and the output conductor 50. Consequently, no input voltage is applied to the input transformer 3, and no signal is applied between the amplifier input terminals 34 and 35 or between the input terminals 40 and 41 of the circuit 5. Under this condition, the circuit 5 produces between the output terminals 42 and 43 and across the motor control winding 47 a signal which acts on the rotor 14 to prevent rotation of the latter. Consequently, the contact 10 is prevented from moving relative to the slide-wire resistance 9 as long as the system remains balanced.

Upon a subsequent increase in the temperature of the furnace 8 above the temperature value at which the system was balanced as just described, the potentiometric circuit becomes unbalanced, and a unidirectional voltage appears in the output of the circuit 1, between the point 51 and the conductor 50, having a magnitude proportional to the magnitude of the temperature increase and hence to the extent of the potentiometric circuit unbalance, and having a given polarity corresponding to a temperature increase. This voltage is applied across the input transformer primary winding 31, but is periodically reduced to zero by the short-circuiting action of the converter contacts 26 and 30 which are respectively connected to the ends of the winding 31. Since the converter coil 27 is energized with 60 cycle voltage, the voltage applied across the primary winding 31 will pulse at the rate of 60 times per second, with the result that an alternating current signal will be developed across the secondary winding 32 having a magnitude proportional to the magnitude of the temperature increase and to the extent of the potentiometric unbalance, having a frequency of 60 cycles per second, and having a given phase corresponding to a temperature increase.

The signal just described is applied to the input of the amplifier 4, wherein it is amplified, and the resulting signal is fed into the input of the circuit 5. The latter then delivers to the motor control winding 47 a signal of such phase and magnitude that the rotor 14 is caused to rotate in such a manner as to drive the contact 10 along the slide-wire resistance 9 up-scale or to the right in Fig. 1 to a new balance position corresponding to the new, increased temperature. When the contact 10 has been moved into this position, the system is once more balanced, and the rotor 14 and contact 10 are prevented from further movement until a subsequent temperature change in the furnace 8 takes place.

Upon a subsequent decrease in the furnace temperature, the converse of what has just been described takes place. Specifically, a unidirectional voltage appears between the point 51 and the conductor 50 having a magnitude proportional to the magnitude of the temperature decrease and having a polarity opposite to that corresponding to a temperature increase. By the conjoint action of the converter 2 and transformer 3, this voltage is converted into a 60 cycle alternating current signal which appears between the amplifier input terminals 34 and 35 having a magnitude proportional to the magnitude of the temperature decrease, and being of opposite phase with respect to the corresponding signal produced by a temperature increase. The signal is amplified by the amplifier 4 and is fed to the circuit 5, which delivers to the motor control winding 47 a signal of such phase and magnitude that the rotor 14 is caused to drive the contact 10 down-scale or to the left in Fig. 1 to a new balance position corresponding to the new, decreased temperature. When the contact 10 has moved to this position, the system is once more balanced, and the rotor 14 and contact 10 are prevented from further movement until a subsequent temperature change takes place.

The manner in which the apparatus of Fig. 1 herein described functions to perform the operations outlined above is described in detail in the aforementioned Wills Patent No. 2,423,540, and hence no further description will be made herein. Moreover, the portion of the apparatus of Fig. 1 already described is practically identical to that disclosed and claimed in the aforementioned Wills application, except with reference to the transformer 3, which is slightly different from that disclosed in said Wills application, and with reference to the means employed to effect standardization. The standardizing means shown in Fig. 1 and about to be described forms the basis of the present invention and is that which is claimed herein.

The continuous automatic standardizing apparatus of Fig. 1 comprises a standard cell 63, an input transformer 64, an electronic voltage amplifier 65, a power amplifier and motor drive circuit 66, a two phase reversible induction motor 67, and a mechanical linkage 68. The transformer 64 may be identical to the transformer 3, having a primary winding 69 and a secondary winding 70 wound on a core 71. The amplifier 65 may be identical to the amplifier 4, having input terminals 72 and 73, energizing terminals 74 and 75, and output terminals 76 and 77, and the circuit 66 may be identical to the circuit 5, having input terminals 78 and 79, energizing terminals 80 and 81, and output terminals 82 and 83. The motor 67 may be identical to the motor 6, comprising a power winding 84, a control winding 85, and a rotor 86.

The amplifier 65, circuit 66, and motor power winding 84 are energized from the conductors 55 and 56 through the respective branch supply conductors 87, 88, 89, 90, 91, and 92. A condenser 93 is connected in series with the winding 84, and a condenser 94 is connected in parallel with the motor control winding 85. The motor rotor 86 is mechanically coupled by means of the linkage 68 to the sliding contact 22A of the variable resistor 22, which is connected in the potentiometric circuit energizing branch. This coupling is such that rotation of the rotor 86 in one direction moves the contact 22A along the resistor 22 to increase the effective resistance of the latter and hence decrease the energizing current flowing in the potentiometric circuit 1. Rotation of the rotor 86 in the opposite direction moves the contact 22A to decrease the resistance of the resistor 22 and hence to increase the potentiometric circuit energizing current.

One terminal of the standard cell 63 is connected to one end of the resistor 24, this end being the one opposite that connected to the point 51. The remaining standard cell terminal is connected to the converter contact 29 and to one end terminal of the primary winding 69 of the transformer 64. The remaining end of this winding is connected to the point 51 of the circuit 1.

The secondary winding 70 is connected across the input terminals 72 and 73 of the amplifier 65, and the output terminals 76 and 77 of the latter are respectively connected to the input terminals 78 and 79 of the circuit 66. The motor control winding 85 is connected across the output terminals 82 and 83 of the circuit 66.

The resistance value of the resistor 24 is so chosen that when the energizing current produced by the battery 21 and flowing in the circuit 1 is of such magnitude that the voltage drop across the slide-wire resistance 9 has a predetermined, normal value, the voltage drop across the resistor 24 is just equal to the E. M. F. of the standard cell.

As is evident from the description of the apparatus previously given, the resistor 24 and the standard cell 63 are connected in series with the primary winding 69 of the transformer 64. This connection is made in such a manner that the voltage drop across the resistor 24 opposes the E. M. F. of the standard cell 63, so that when this voltage drop is just equal in magnitude to the standard cell E. M. F., no current flows in the primary windling 69. Therefore, when the energizing current flowing in the circuit 1 and produced by the battery 21 is of the correct value to produce the normal voltage drop across the slide-wire resistance 9, no current flows through the winding 69, and no signal is applied to either the amplifier 65 or the circuit 66. Under this condition the standardizing circuit is balanced and the circuit 66 delivers to the motor control winding 85 a signal which acts to prevent rotation of the rotor 86 and to prevent movement of the sliding contact 22A on the resistor 22.

If the terminal voltage of the battery 21 decreases below the value responsible for the balanced condition of the standardizing circuit as just described, the energizing current flowing in the circuit 1 will decrease in magnitude and consequently the voltage drop across the resistor 24 will decrease. This voltage drop will now not be equal and opposite to the standard cell E. M. F., and hence a current will flow in the transformer primary winding 69. This current will be a pulsating one however, due to the periodic short-circuiting action of the converter contacts 28 and 29, which contacts are seen to be connected across the winding 69.

As a result of this pulsating current flowing through the winding 69, an alternating current signal will appear across the secondary winding 70 and between the amplifier input terminals 72 and 73 having a frequency of 60 cycles per second, having a magnitude proportional to the extent of the energizing current decrease, and being of a given phase corresponding to a decrease in potentiometric energizing current and battery voltage.

The signal applied to the input of the amplifier 65 is amplified therein in the conventional manner and is applied between the input terminals 78 and 79 of the power amplifier and motor drive circuit 66. The latter functions to produce in response to this signal a motor drive signal which is applied to the motor control winding 85. This drive signal is of such phase and magnitude as to cause the rotor 86 to rotate and to move the sliding contact 22A along the resistor 22 in a direction to decrease the effective resistance of the latter and hence to increase the potentiometer energizing current. The motor 67 will continue to thus drive the contact 22A to increase the energizing current until the latter has once more reached its normal value. When this occurs, the voltage drop across the resistor 24 will once more be equal and opposite to the standard cell E. M. F., no signal will be applied to the amplifier 65, the standardizing circuit will again be balanced, and the contact 22A and rotor 86 will be prevented from having further motion until a subsequent change takes place in the voltage of the battery 21.

If the terminal voltage of the battery 21 should increase, the standardizing system will function in such a manner that the motor 67 will drive the contact 22A to increase the effective resistance of the resistor 22 and hence decrease the potentiometric energizing current. This will continue until the energizing current is returned to its normal value and the standardizing circuit is once more in balance.

From the description just given, it can be seen that the response of the standardizing system to an unbalance of this system, due to a change in the terminal voltage of the battery 21, is analogous to the response of the potentiometric measuring system to an unbalance due to a change in the temperature being measured by the thermocouple 7. Similarly, the manner in which the standardizing system functions to restore the energizing current of the potentiometric system to its normal value, and hence to rebalance the standardizing system, is analogous to the manner in which the potentiometric measuring system functions to restore the condition of zero potentiometric circuit output voltage, and hence to rebalance the measuring system. It is to be noted, however, that unbalance and rebalancing of the measuring system in no way affects the standardizing system, and that rebalancing of the latter in no way affects the measurements made by or the operation of the measuring system. This latter statement is true since the standardizing system is in continuous operation, and, therefore, any minute change in the terminal voltage of the battery 21 is compensated for by an adjustment of the resistor 22 before such a change can affect the accuracy of the measurements made by the potentiometric measuring system.

Figure 2:
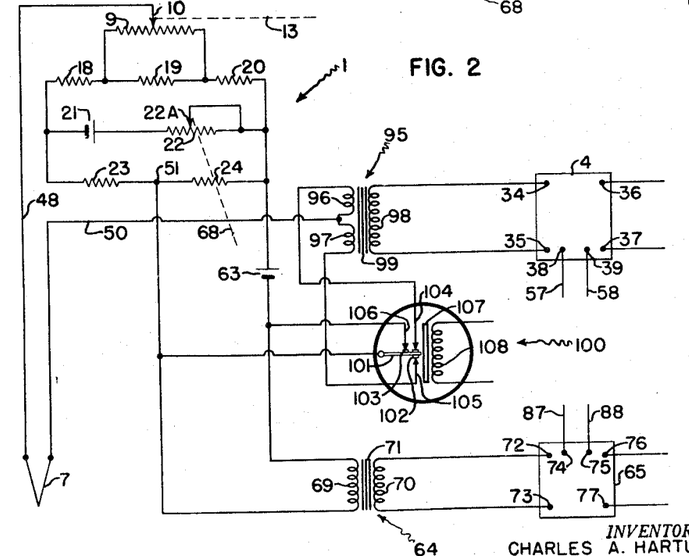
Figs. 2 and 3 are circuit diagrams illustrating two different modifications of the system of Fig. 1.

In Fig. 2 there is shown a modification of the system of Fig. 1 wherein there is employed a different form of measuring system input transformer and a different converter, for the purpose of providing a more desirable signal in the measuring system. All apparatus and connections not shown in Fig. 2 are identical to the corresponding apparatus and connections of Fig. 1, and apparatus shown in Fig. 2 bearing reference characters shown in Fig. 1 is identical to the corresponding apparatus of Fig. 1.

In Fig. 2, the transformer 3 of Fig. 1 is replaced by a transformer 95, having a split primary winding comprising sections 96 and 97, and having a secondary winding 98 and a core 99. The converter 2 of Fig. 1 is replaced in Fig. 2 by a converter 100 comprising a vibrating reed 101 which carries contacts 102 and 103, relatively stationary contacts 104, 105 and 106, a permanent magnet 107, and an operating coil 108. The converter 100 is identical to the converter 2 except for the inclusion of the moving contact 103 and the relatively stationary contact 106 in the converter 100. The contacts are so arranged in the converter 100 that the contacts 103 and 106 are in engagement whenever the contacts 102 and 104 are engaged, and the contacts 103 and 106 are out of engagement whenever the contacts 102 and 105 are engaged.

The point 51 of the potentiometric circuit 1 is connected to the converter reed 101 and through the latter to the converter contacts 102 and 103. The point 51 is also connected to one end terminal of the standardizing system input transformer primary winding 69 as before. The other end terminal of this winding is connected as before to one of the terminals of the standard cell 63, and is also connected to the converter contact 106. Thus the converter contacts 103 and 106 are connected across the winding 69 in the same manner as are the contacts 26 and 29 in Fig. 1.

The conductor 50 from the thermocouple 7 is connected to the junction between the end terminals of the sections 96 and 97 of the split primary winding of the transformer 95. The remaining end terminal of the winding section 96 is connected to the converter contact 104, and the remaining end terminal of the winding section 97 is connected to the converter contact 105. The converter coil 108 is energized with alternating current as before. It can be readily seen that as the converter reed vibrates under the influence of the coil 108, the primary winding sections 96 and 97 are alternately connected between the conductor 50 and the point 51 across the output of the potentiometric measuring circuit 1. Consequently, the output of the circuit 1 is not periodically short-circuited by the converter contacts as it is in the arrangement of Fig. 1. The resulting signal produced in the secondary winding 98 will be of more suitable wave form and will have a greater effective value than will the corresponding signal produced by the Fig. 1 arrangement. Hence, the measurements made with the apparatus of Fig. 2 will be inherently more accurate than corresponding measurements made with the apparatus of Fig. 1.

Figure 3:
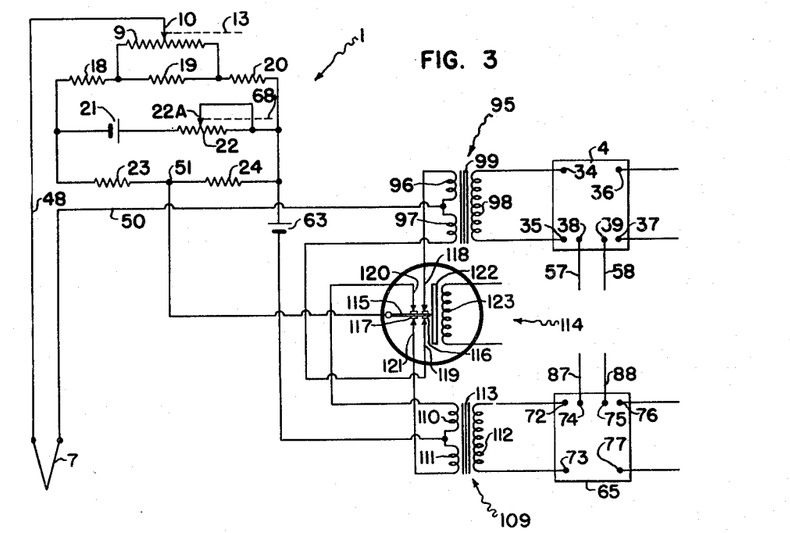

In Fig. 3 there is illustrated another modification of the system of Fig. 1 wherein there is employed a different form of standardizing system input transformer and a different converter, for the purpose of providing a more desirable signal in the standardizing system. The apparatus of Fig. 3 also includes the modification to the measuring system as illustrated in Fig. 2. All apparatus and connections not shown in Fig. 3 are identical to the corresponding apparatus and connections of Fig. 1, and apparatus shown in Fig. 3 bearing reference characters shown in Figs. 1 and 2 is identical to the corresponding apparatus of Figs. 1 and 2.

The input transformer 95 of Fig. 2 is included in the potentiometric measuring system of Fig. 3. However, in the latter figure, the standardizing system input transformer 64 of Figs. 1 and 2 is replaced by a transformer 109. This transformer is identical to the transformer 95, comprising a split primary winding having sections 110 and 111, and including a secondary winding 112 and a core 113. The converter 2 of Fig. 1 is replaced in Fig. 3 by a converter 114 which is identical to the converter 2 except for the addition of a second movable contact and a second pair of relatively stationary contacts. Thus the converter 114 comprises a vibrating reed 115 carrying a contact 116 and a second contact 117. Cooperating with the contact 116 are relatively stationary contacts 118 and 119, and cooperating with the contact 117 are relatively stationary contacts 120 and 121. The converter 114 also includes a permanent magnet 122 and an alternating current energized operating coil 123.

In the system of Fig. 3, the point 51 in the circuit 1 is connected to the converter reed 115 and through the latter to the movable contacts 116 and 117. The thermocouple conductor 50 is connected as before to the junction between the end terminals of the primary winding sections 96 and 97, and the remaining end terminals of these sections are respectively connected to the converter contacts 118 and 119. Thus the transformer 95 and the potentiometric circuit 1 are connected to the converter 114 in the same manner as they are connected to the converter 100 of Fig. 2.

One terminal of the standard cell 63 is connected to one end of the resistor 24 as before, and the remaining standard cell terminal is connected to the junction between the end terminals of the primary winding sections 110 and 111 of the transformer 109. The remaining end terminals of these winding sections are respectively connected to the converter contacts 120 and 121. The secondary winding 112 is connected between the amplifier input terminals 72 and 73.

The contacts of the converter 114 are so arranged that the contacts 118 and 116 are engaged at the same time that the contacts 120 and 117 are engaged. Likewise, the contacts 119 and 116 are engaged at the same time that the contacts 121 and 117 are engaged. Therefore, the primary winding sections 110 and 111 are alternately connected between the point 51 and the terminal of the standard cell 63 which is not directly connected to the resistor 24. It is evident that in the apparatus of Fig. 3, the resistor 24 and the standard cell 63 are never directly connected in voltage opposition as they are by the short-circuiting action of the converters 2 and 100 in Figs. 1 and 2, respectively. Consequently, the standard cell 63 is never subjected to an undesirable current drain.

The advantage of the arrangement of Fig. 3 over that of Fig. 2 is that in the Fig. 3 apparatus a signal is produced in the secondary winding 112 of the standardizing transformer 109 which has a better wave form and a greater effective value than has the corresponding signal which is produced in the systems of Figs. 1 and 2. This enables more perfect continuous standardizing to be accomplished than is obtained with the arrangements of Figs. 1 and 2.

Figure 4:
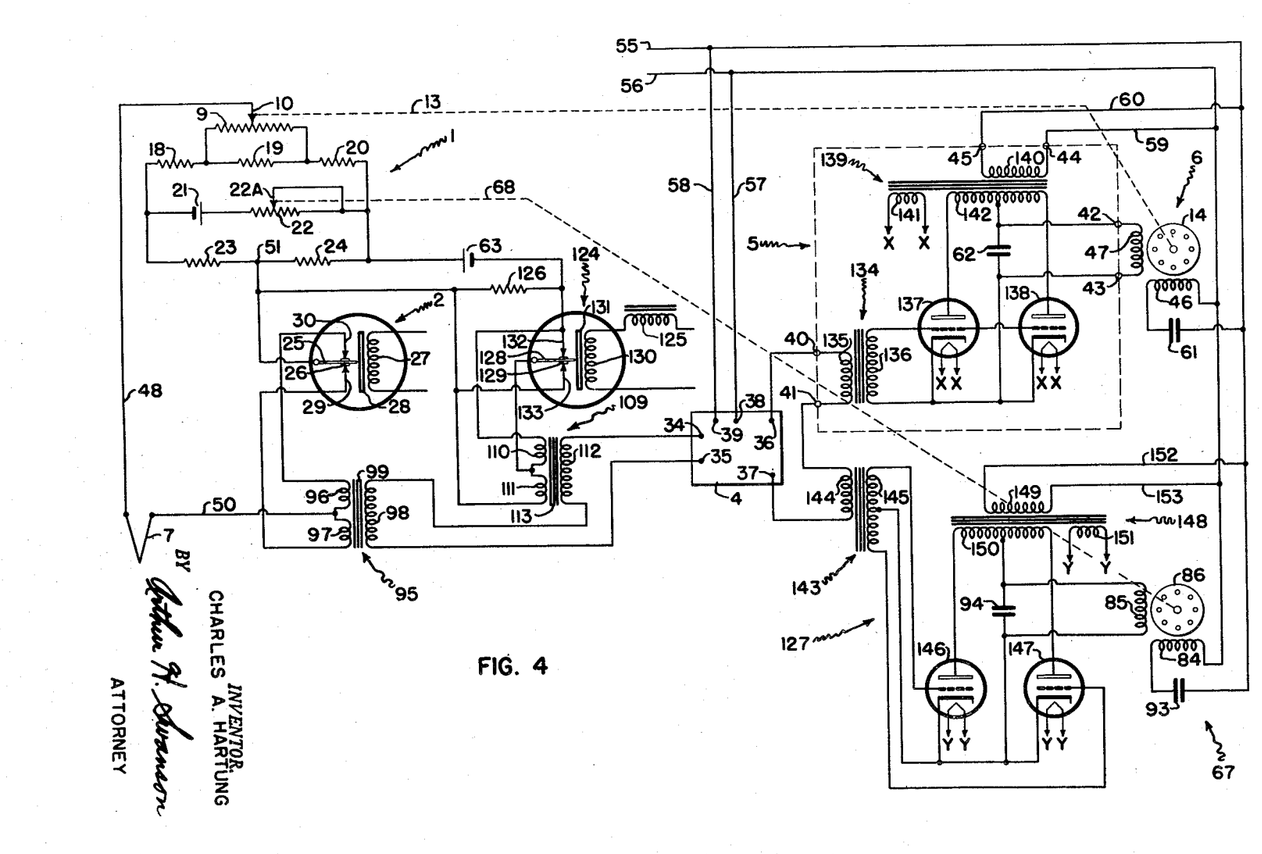
Fig. 4 is a circuit diagram illustrating another modification of the system of Fig. 1 in which is employed a standardizing control system different from that of Fig. 1.

In Fig. 4 there is illustrated another modification of the system of Fig. 1 in which is employed standardizing apparatus differing from that used in the Fig. 1 system. The potentiometric measuring circuit 1, converter 2, thermocouple 7, voltage amplifier 4, power amplifier and motor drive circuit 5, motor 6 and motor 67 of Fig. 1 are all included and connected in the Fig. 4 arrangement as they are in that of Fig. 1. The system of Fig. 4 also includes the transformers 95 and 109 of Fig. 3, a converter 124, an inductance 125, a resistor 126, and a power amplifier and motor drive circuit 127, the latter replacing the voltage amplifier 65 and the circuit 66 of the arrangements of Figs. 1–3.

The converter 124 may be identical to the converter 2, comprising a reed 128 which carries a contact 129, an operating coil 130, a permanent magnet 131, and relatively stationary contacts 132 and 133. The circuit 5 is shown as comprising an input transformer 134 having a primary winding 135 and a secondary winding 136, two triode electron tubes 137 and 138, each comprising a plate, a control grid, a cathode, and a cathode heater, and a power transformer 139 having a primary winding 140, a cathode heater energizing winding 141, and a secondary winding 142.

In the circuit 5, the input terminals 40 and 41 are respectively connected to the end terminals of the input transformer primary winding 135. One end terminal of the associated secondary winding 136 is connected to the control grids of the triodes 137 and 138, and the remaining secondary end terminal is connected to the cathodes of these triodes and to the output terminal 43.

The remaining output terminal 42 is connected to a center-tap on the power transformer secondary winding 142, and each of the end terminals of the latter is respectively connected to one of the plates of the triodes 137 and 138. The power transformer primary winding 140 is connected between the energizing terminals 44 and 45, and the cathode heater secondary winding 141 is connected to the cathode heaters of the triodes 137 and 138 by partially shown conductors X in such a manner as to supply the necessary energizing currents to these cathode heaters.

The form of the circuit 5 which is illustrated by way of example in Fig. 4 is that disclosed in the aforementioned Wills patent. The circuit 5 of Fig. 4 is also disclosed in U. S. Patent 2,376,527 granted to Walter P. Wills on May 22, 1945, in connection with apparatus employing a circuit of the form of the circuit 127 of Fig. 4, about to be described.

The power amplifier and motor drive circuit 127 is similar to the circuit 5 except that the circuit 127 is responsive only to input signals having a frequency of 120 cycles per second to produce motor drive, whereas the circuit 5 is responsive only to input signals having a frequency of 60 cycles per second to produce motor drive. The circuit 127 comprises an input transformer 143, having a primary winding 144 and a secondary winding 145, triode electron tubes 146 and 147, each having a plate, a control grid, a cathode, and a cathode heater, and a power transformer 148 having a primary winding 149, a secondary winding 150, and a cathode heater energizing winding 151.

Each of the end terminals of the input transformer secondary winding 145 is respectively connected to one of the control grids of the triodes 146 and 147. A center-tap on the winding 145 is connected to the cathodes of these triodes and to one end terminal of the motor control winding 85. The remaining motor control winding terminal is connected to a center-tap on the power transformer secondary winding 150, and each of the end terminals of the latter is respectively connected to one of the plates of the triodes 146 and 147.

The primary winding 149 of the power transformer 148 is connected between the supply conductors 55 and 56 by means of branch conductors 152 and 153, and the cathode heaters of the triodes 146 and 147 are connected to the winding 151 and energized therefrom through the partially shown conductors Y.

The potentiometric measuring portion of Fig. 4 is connected essentially as before, the point 51 of the circuit 1 being connected to the converter contact 26, and the thermocouple conductor 50 being connected to the junction of the end terminals of the primary winding sections 96 and 97. The remaining end terminal of the winding 96 is connected to the converter contact 30, and the remaining end terminal of the winding 97 is connected to the converter contact 29.

The input portion of the stanardizing system is connected in a novel manner which causes the signal developed in the input transformer secondary winding 112 to have a frequency of 120 cycles per second, which is twice the frequency of the voltage used to energize the converter operating coils 27 and 130. To this end, the converter contact 133 is connected to one end terminal of the standardizing input transformer primary winding 111 and to the point 51. The converter contact 132 is connected to one end terminal of the winding 110 and to one terminal of the standard cell 63. The remaining terminal of the latter is connected to one end of the resistor 24 as before, and the remaining end terminals of the windings 110 and 111 are connected together and to the converter contact 129 only. The resistor 126 is connected between the converter contacts 132 and 133 for improving the wave form of the output voltage of the converter 124.

As can be seen from Fig. 4, the primary winding sections 110 and 111 of the standardizing input transformer 109 are normally connected in series with the standard cell 63 and the standardizing resistor 24. Any current produced by a need for standardizing will therefore flow through the windings 110 and 111. However, as the converter contact 129 alternately engages the contacts 132 and 133, the windings 110 and 111 are alternately short-circuited, each winding being so short-circuited once each cycle of the converter energizing voltage. Since the converter coils are energized with 60 cycle current, the short-circuiting of the two primary windings each cycle causes a 120 cycle signal to be produced in the secondary winding 112 as a result of a need for standardizing. This signal correspondings to the 60 cycle signal produced in the winding 112 in the apparatus of Fig. 3.

The converter coil 130 of the standardizing converter 124 is energized in the same manner as are the operating coils of the other converters described herein, except for the fact that the previously mentioned inductance 125 is connected in series with one of the conductors supplying the coil 130 with energizing current. The effect of this inductance is to cause the voltage supplied to the coil 130 to be shifted in phase with respect to the phase of the supply voltage for a purpose to be described hereinafter.

The secondary windings 98 and 112 of the respective transformers 95 and 109 are connected in series between the amplifier input terminals 34 and 35. Therefore, when the measuring and standardizing circuits are unbalanced, a complex signal is applied between the input terminals 34 and 35 consisting of a 60 cycle component from the transformer 95 and the measuring circuit, representative of measuring circuit unbalance, and a 120 cycle component from the transformer 109 and the standardizing circuit, representative of standardizing circuit unbalance. Due to the effect of the reactor 125 in the coil energizing circuit of the standardizing converter 124, the 120 cycle standardizing signal component will be shifted in phase through 45° of the 60 cycle measuring signal component for a reason to be described hereinafter.

The input terminal 40 of the power amplifier and motor drive circuit 5 is connected as before to the amplifier output terminal 36. The primary winding 144 of the transformer 143 of the standardizing power amplifier and motor drive circuit 127 is connected between the amplifier output terminal 37 and the input terminal 41 of the circuit 5. Thus the primary windings 135 and 144 are connected in series between the amplifier output terminals 36 and 37.

When either the 60 cycle signal or the 120 cycle signal or both are applied to the input of the amplifier 4, the amplified resultant of the input signal will appear across both of the primary windings 135 and 144 and the secondary windings 136 and 145 in the usual manner. As described in detail in the aforementioned Wills Patent No. 2,423,540 and in the Wills Patent 2,376,527, and mentioned hereinbefore, the circuit 5 is operative to produce a signal to cause operation of the motor 6 only in response to a 60 cycle input signal. Consequently, only a 60 cycle signal across the winding 136 will produce motor drive in the motor 6, the 120 cycle signal, if present, having no effect on the operation of the motor 6. Therefore, the circuit 5 and motor 6 respond to measuring circuit unbalance to effect rebalancing of the measuring circuit in the same manner as previously described.

As hereinbefore mentioned, the circuit 127 is operative to produce a signal to cause operation of the motor 67 only in response to a 120 cycle input signal which is shifted in phase 45° with respect to the supply voltage phase. Consequently, only such a 120 cycle signal across the winding 145 will produce motor drive in the motor 67, the 60 cycle signal, if present, having no effect on the operation of the motor 67. Therefore, the circuit 127 and motor 67 respond to standardizing circuit unbalance to effect rebalancing of the standardizing circuit, and hence standardizing of the potentiometric system, in the same manner as previously described.

The operation of the circuit 127 whereby the latter produces motor drive signals only in response to 120 cycle input signals is explained in detail in the aforementioned Wills Patent 2,376,527, and such operation will therefore not be elaborated on herein. Suffice it to say that the circuit 127 produces motor drive signals in response to 120 cycle input signals of the correct phase, which motor drive signals are identical to motor drive signals produced by the circuit 5 in response to equivalent 60 cycle input signals. Such operation will be apparent to those skilled in the art when considered in connection with the descriptions given herein.

An important advantage of the system of Fig. 4 over the systems previously disclosed herein is that in the Fig. 4 arrangement only one voltage amplifier is employed, the amplifier 65 being eliminated from this apparatus. In Fig. 4, the amplifier 4 serves the dual purpose of amplifying both the measuring circuit and the standardizing circuit unbalance signals.

Figure 5:
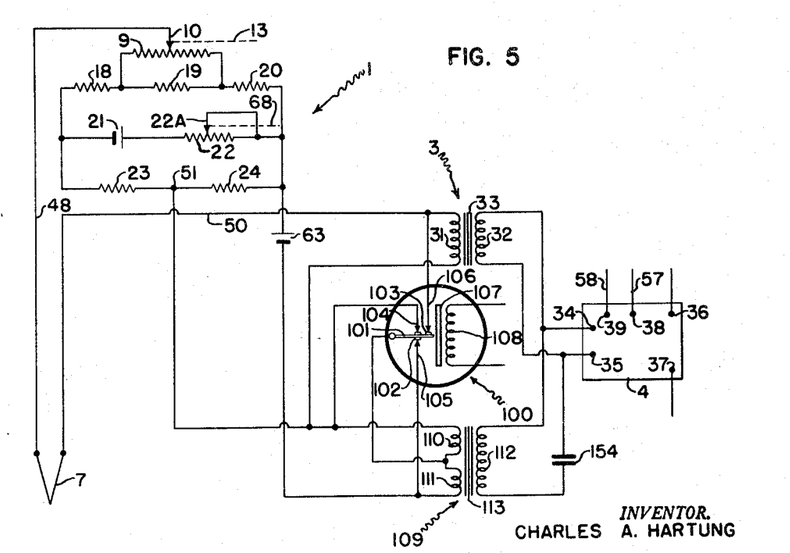
Fig. 5 is a circuit diagram illustrating a modification of the system of Fig. 4.

There is illustrated in Fig. 5 another modification of the apparatus of Fig. 1 wherein a single converter of the type employed in the Fig. 2 arrangement replaces the two converters 2 and 124 of Fig. 4. To this end, the system of Fig. 5 includes the measuring circuit 1 and the input transformer 3 of Fig. 1, the converter 100 of Fig. 2, and the standardizing input transformer 109 of Figs. 3 and 4. The Fig. 5 arrangement also includes the thermocouple 7, the standard cell 63 and the amplifier 4. All of the components and connections in the circuit of Fig. 5 past the output of the amplifier 4 and not shown in Fig. 5 are the same as the corresponding components and connections as illustrated in Fig. 4.

In the arrangement of Fig. 5, the point 51 in the circuit 1 is connected to one end terminal of the input transformer primary winding 31. This point is also connected to the converter contact 104, and to one end terminal of the standardizing input transformer primary winding section 110. The remaining end terminal of the primary winding 31 is connected to the converter contact 106 and to the thermocouple conductor 50. The remaining end terminal of the winding 110 is connected to the adjacent terminal of the winding 111 and to the movable converter contacts 102 and 103. The remaining terminal of the winding 111 is connected to the converter contact 105 and to one terminal of the standard cell 63. The other terminal of the latter is connected to the resistor 24 as before.

The secondary winding 32 of the transformer 3 is connected between the amplifier input terminals 34 and 35. The secondary winding 112 of the transformer 109 is connected in series with a condenser 154 between the terminals 34 and 35. The value of this condenser is so chosen that the signal from the winding 112 is caused to be displaced 45° in phase from the signal from the winding 32.

From the description just given it can be seen that the converter contacts 104 and 106 are connected across the primary winding 31. Therefore, as the converter operates in the normal manner, the winding 31 is short-circuited once every cycle of the supply voltage, as hereinbefore described in connection with the arrangement of Fig. 1. Consequently, a 60 cycle signal representative of measuring circuit unbalance will appear across the secondary winding 32 and across the input of the amplifier 4 as before. It can also be seen that the converter contacts 104 and 102, and 105 and 102 alternately short-circuit their respective primary winding sections 110 and 111, each of the latter winding sections being so short-circuited once each cycle of the supply voltage, as described in connection with the Fig. 4 arrangement. Consequently, a 120 cycle signal representative of standardizing circuit unbalance will appear across the secondary winding 112 as in the Fig. 4 arrangement. Since this last mentioned signal passes through the condenser 154, it is shifted in phase 45° with respect to the 60 cycle signal and the supply voltage, as is necessary for the required operation of the power amplifier and motor drive circuit 127.

Since in the system of Fig. 5 there are produced in the input of the amplifier 4 a 60 cycle signal representative of measuring circuit unbalance and a 120 cycle signal representative of standardizing circuit unbalance, the operation of this system is identical to that of the Fig. 4 arrangement, previously described. The Fig. 5 arrangement does possess the advantage over that of Fig. 4 of utilizing only one converter for both the measuring and standardizing circuits. It may be noted that the arrangements disclosed herein for providing continuous automatic standardizing may be effectively employed when the energizing battery 21 is replaced by a rectifier and a suitable source of alternating current as potentiometric circuit energizing means.

Subject matter disclosed but not claimed herein is disclosed and claimed in my copending U. S. patent application, Serial No. 102,193, filed June 30, 1949.

While, in accordance with the provisions of the statutes, I have illustrated and described the best forms of embodiment of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure with Letters Patent is:

1. Measuring apparatus including a pair of terminals adapted to be connected to a source of voltage to be measured, a balanceable potentiometric measuring circuit including an adjustable resistor and adapted to produce a first output signal representative of the value of the voltage to be measured, a source of variable energizing voltage, a source of standard voltage, connections between said measuring circuit, said source of variable energizing voltage, and said source of standard voltage whereby a voltage drop is produced across said resistor and whereby said measuring circuit is operative to produce a second output signal representative of the value of the voltage drop across said resistor, converting and amplifying means having an input circuit adapted to receive both of said output signals and having a single electromagnetic, vibrating reed converter adapted to modify simultaneously and continuously both of said output signals, balancing means connected to said converting and amplifying means and responsive to said first output signal to adjust said resistor continuously to maintain said measuring circuit in continuous balance, and a reversible electric motor connected to said converting and amplifying means and responsive to said second output signal continuously to maintain constant the voltage drop across said resistor.

2. In measuring apparatus, the combination of a balanceable potentiometric measuring circuit including a fixed resistor and a variable resistor having a sliding contact which engages said variable resistor, a source of energizing voltage for said measuring circuit, an adjustable resistor connected in series between said circuit and said source of energizing voltage and adapted to control the magnitude of the energizing voltage supplied to said circuit, whereby voltage drops are produced across said variable resistor and said fixed resistor which are dependent in magnitude on the adjustment of said adjustable resistor, a source of standard voltage, a pair of terminals adapted to be connected to a source of voltage to be measured, first control means operative continuously to position said sliding contact on said variable resistor in accordance with the magnitude of the voltage being measured to maintain said measuring circuit continuously balanced and comprising a transformer having a primary winding connected in series with a portion of said measuring circuit between said terminals and having a secondary winding, second control means operative continuously to adjust said adjustable resistor to maintain constant the voltage drop across said variable resistor and comprising a second transformer having a primary winding in series with which are connected said source of standard voltage and said fixed resistor and having a secondary winding, and converting means common to both said first and second control means and comprising an electro-mechanical, vibrating reed converter having a movable contact, two stationary contacts, and an operating coil adapted to be energized with alternating current and operative to move said movable contact into and out of engagement with one of said stationary contacts once during the first half of each cycle of the alternating current and to move said movable contact into and out of engagement with the other of said stationary contacts once during the second half of each cycle of the alternating current, said movable contact being electrically connected to one end of each of said primary windings, said one stationary contact being electrically connected to the other end of one of said primary windings, and said other stationary contact being electrically connected to the other end of the other of said primary windings, whereby a first alternating current signal is produced across one of said secondary windings and a second alternating current signal, having a frequency the same as that of the first signal, is produced across the other of said secondary windings.

3. In measuring apparatus, the combination of a balanceable potentiometric measuring circuit including a fixed resistor and a variable resistor having a sliding contact which engages said variable resistor, a source of energizing voltage for said measuring circuit, an adjustable resistor connected in series between said circuit and said source of energizing voltage and adapted to control the magnitude of the energizing voltage supplied to said circuit, whereby voltage drops are produced across said variable resistor and said fixed resistor which are dependent in magnitude on the adjustment of said adjustable resistor, a source of standard voltage, a pair of terminals adapted to be connected to a source of voltage to be measured, first control means operative continuously to position said sliding contact on said variable resistor in accordance with the magnitude of the voltage being measured to maintain said measuring circuit continuously balanced and comprising a transformer having a center-tapped primary winding and a secondary winding, second control means operative continuously to adjust said adjustable resistor to maintain constant the voltage drop across said variable resistor and comprising a second transformer having a center-tapped primary winding and a secondary winding, converting and amplifying means common to both said first and second control means and comprising a single channel electronic voltage amplifier and first and second electro-mechanical, vibrating reed converters, each of said converters having a movable contact, two stationary contacts, and an operating coil adapted to be energized with alternating current and operative to move its associated movable contact into and out of engagement with one of its associated stationary contacts once during the first half of each cycle of the alternating current and to move its associated movable contact into and out of engagement with the other of its associated stationary contacts once during the second half of each cycle of the alternating current, an electrical connection between one of the stationary contacts of said first converter and one end of the primary winding of said first transformer, an electrical connection between the other end of the latter and the other stationary contact of said first converter, a connection including said terminals and a portion of said measuring circuit connected in series between the movable contact of said first converter and the center-tap of the primary winding of said first transformer, an electrical connection between one of the stationary contacts of said second converter and one end of the primary winding of said second transformer, an electrical connection between the other end of the latter and the other stationary contact of said second converter, said source of standard voltage and said fixed resistor being connected in series with the primary winding of said second transformer independently of the contacts of said second converter, and an electrical connection between the center-tap of the primary winding of said second transformer and the movable contact of said second converter, whereby a first alternating current signal is produced across the secondary winding of said first transformer and a second alternating current signal, having a frequency which is twice that of the first signal, is produced across the secondary winding of said second transformer.

4. In measuring apparatus, the combination of a balanceable potentiometric measuring circuit including a fixed resistor and a variable resistor having a sliding contact which engages said variable resistor, a source of energizing voltage for said measuring circuit, an adjustable resistor connected in series between said circuit and said source of energizing voltage and adapted to control the magnitude of the energizing voltage supplied to said circuit, whereby voltage drops are produced across said variable resistor and said fixed resistor which are dependent in magnitude on the adjustment of said adjustable resistor, a source of standard voltage, a pair of terminals adapted to be connected to a source of voltage to be measured, first control means operative continuously to position said sliding contact on said variable resistor in accordance with the magnitude of the voltage being measured to maintain said measuring circuit continuously balanced and comprising a transformer having a primary winding connected in series with a portion of said measuring circuit between said terminals and having a secondary winding, second control means operative continuously to adjust said adjustable resistor to maintain constant the voltage drop across said variable resistor and comprising a second transformer having a center-tapped primary winding in series with which are connected said source of standard voltage and said fixed resistor and having a secondary winding, converting and amplifying means common to both said first and second control means and comprising a single channel electronic voltage amplifier and an electro-mechanical, vibrating reed converter having a movable contact, three stationary contacts, and an operating coil adapted to be energized with alternating current and operative to move said movable contact into and out of simultaneous engagement with two of said stationary contacts once during the first half of each cycle of the alternating current and to move said movable contact into and out of engagement with the other of said stationary contacts once during the second half of each cycle of the alternating current, an electrical connection between one of said two stationary contacts and one end of the primary winding of said first transformer, an electrical connection between the other end of the latter and the other of said two stationary contacts, an electrical connection between the last mentioned contact and one end of the primary winding of said second transformer, an electrical connection between the other end of the latter and said other stationary contact, and an electrical connection between the center-tap of the primary winding of said second transformer and said movable contact, whereby a first alternating current signal is produced across the secondary winding of said first transformer and a second alternating current signal, having a frequency which is twice that of the first signal, is produced across the secondary winding of said second transformer.

5. In measuring apparatus, the combination of an adjustable measuring circuit including a source of variable energizing voltage and adapted to produce unidirectional measuring output signals which are representative of the values of a quantity being measured and to produce unidirectional standardizing output signals which are representative of variations in said energizing voltage, an amplifying and motor drive circuit having an input circuit including said measuring circuit, having two output circuits, and having at least one portion adapted to modify continuously and simultaneously both of said output signals and including an electro-mechanical, vibrating reed converter adapted to convert said measuring output signals into pulsating signals and to convert said standardizing output signals into other pulsating signals, a first reversible electric motor connected in one of said output circuits and adapted to adjust continuously said measuring circuit in response to the modified measuring output signals, and a second reversible electric motor connected in the other of said output circuits and adapted to vary said energizing voltage in response to the modified standardizing output signals to maintain the energizing voltage constant at a predetermined value.

6. In measuring apparatus, the combination of an adjustable measuring circuit including a source of variable energizing voltage and adapted to produce unidirectional measuring output signals which are representative of the values of a quantity being measured and to produce unidirectional standardizing output signals which are representative of variations in said energizing voltage, an amplifying and motor drive circuit having an input circuit including said measuring circuit, having two output circuits, and having at least one portion adapted to modify continuously and simultaneously both of said output signals and including an electro-mechanical, vibrating reed converter adapted to convert said measuring output signals into pulsating signals and to convert said standardizing output signals into other pulsating signals having a frequency of pulsation which is the same as that of the first mentioned signals, a first reversible electric motor connected in one of said output circuits and adapted to adjust continuously said measuring circuit in response to the modified measuring output signals, and a second reversible electric motor connected in the other of said output circuits and adapted to vary said energizing voltage in response to the modified standardizing output signals to maintain the energizing voltage constant at a predetermined value.

7. In measuring apparatus, the combination of an adjustable measuring circuit including a source of variable energizing voltage and adapted to produce unidirectional measuring output signals which are representative of the values of a quantity being measured and to produce unidirectional standardizing output signals which are representative of variations in said energizing voltage, an amplifying and motor drive circuit having an input circuit including said measuring circuit, having two output circuits, and having at least one portion adapted to modify continuously and simultaneously both of said output signals and including a single channel, electronic voltage amplifier and a single electro-mechanical, vibrating reed converter, said converter being adapted to convert said measuring output signals into pulsating signals and to convert said standardizing output signals into other pulsating signals having a frequency of pulsation which is substantially different from that of the first mentioned pulsating signals, and said amplifier being arranged to amplify both of said pulsating signals, a first reversible electric motor connected in one of said output circuits and adapted to adjust continuously said measuring circuit in response to the modified measuring output signals, and a second reversible electric motor connected in the other of said output circuits and adapted to vary said energizing voltage in response to the modified standardizing output signals to maintain the energizing voltage constant at a predetermined value.

8. Measuring apparatus of the type including a pair of terminals adapted to be connected to a source of voltage to be measured, a balanceable potentiometric measuring circuit connected to said terminals, a source of variable energizing voltage adapted to apply energizing voltage to said circuit, first electronic converting, amplifying, and control means adapted to maintain said circuit continuously balanced, and second electronic converting, amplifying, and control means adapted to maintain constant the energizing voltage applied to said circuit from said source of energizing voltage, said second electronic means including a reversible electric motor adapted to vary the energizing voltage applied to said circuit and including a single electro-mechanical, vibrating reed converter which is common to both said first and second electronic means and which is operative to produce alternating current signals which are utilized to maintain said circuit continuously balanced and to maintain constant the energizing voltage applied to said circuit.

9. In measuring apparatus, the combination of a balanceable potentiometric measuring circuit including a fixed resistor and a variable resistor having a sliding contact which engages said variable resistor, a source of energizing voltage for said measuring circuit, an adjustable resistor connected in series between said circuit and said source of energizing voltage and adapted to control the magnitude of the energizing voltage supplied to said circuit, whereby voltage drops are produced across said variable resistor and said fixed resistor which are dependent in magnitude on the adjustment of said adjustable resistor, a first pair of terminals between which are connected a source of voltage to be measured and a portion of said measuring circuit, a source of standard voltage, a second pair of terminals between which are connected said source of standard voltage and said fixed resistor, first control means operative continuously to position said sliding contact on said variable resistor in accordance with the magnitude of the voltage being measured to maintain said measuring circuit continuously balanced, said first control means having an input circuit which includes said first pair of terminals and having an output connection which is operative to position said sliding contact, and second control means operative continuously to adjust said adjustable resistor to maintain constant the voltage drop across said variable resistor, said second control means having an input circuit which includes said second pair of terminals, having a reversible electric motor connected to said adjustable resistor and operative to adjust the latter, and including a single electro-mechanical, vibrating reed converter which is common to both said first and second control means and which is operative to produce alternating current signals which are utilized to maintain said measuring circuit continuously balanced and to maintain constant the voltage drop across said variable resistor.

10. In measuring apparatus, the combination of a balanceable potentiometric measuring circuit including a fixed resistor and a variable resistor having a sliding contact which engages said variable resistor, a source of energizing voltage for said measuring circuit, an adjustable resistor connected in series between said circuit and said source of energizing voltage and adapted to control the magnitude of the energizing voltage supplied to said circuit, whereby voltage drops are produced across said variable resistor and said fixed resistor which are dependent in magnitude on the adjustment of said adjustable resistor, a first pair of terminals between which are connected a source of voltage to be measured and a portion of said measuring circuit, a source of standard voltage, a second pair of terminals between which are connected said source of standard voltage and said fixed resistor, first control means operative continuously to position said sliding contact on said variable resistor in accordance with the magnitude of the voltage being measured to maintain said measuring circuit continuously balanced, said first control means having an input circuit which includes said first pair of terminals and having an output connection which is operative to position said sliding contact, and second control means operative continuously to adjust said adjustable resistor to maintain constant the voltage drop across said variable resistor, said second control means having an input circuit which includes said second pair of terminals, having a reversible electric motor connected to said adjustable resistor and operative to adjust the latter, and including a single channel, electronic voltage amplifier and a single electro-mechanical, vibrating reed converter, said amplifier and converter being common to both said first and second control means, said converter being operative to produce a first alternating current signal which is utilized to maintain said measuring circuit continuously balanced and a second alternating current signal which is utilized to maintain constant the voltage drop across said variable resistor and which has a frequency which is substantially different from that of said first alternating current signal, and said amplifier being operative to amplify simultaneously and continuously both of said alternating current signals.

CHARLES A. HARTUNG.

REFERENCES CITED

The following references are of record in the file of this patent:

UNITED STATES PATENTS

| Number | Name | Date |
| --- | --- | --- |
| 2,086,323 | Garstang | July 6, 1937 |
| 2,292,630 | Garstang | Aug. 11, 1942 |
| 2,376,527 | Wills | May 22, 1945 |
| 2,385,481 | Wills | Sept. 25, 1945 |
| 2,427,881 | Schmitt | Sept. 23, 1947 |